W. HASENZAHL.
Boring-Tool for Stone-Working, &c.
No. 224,530. Patented Feb. 17, 1880.
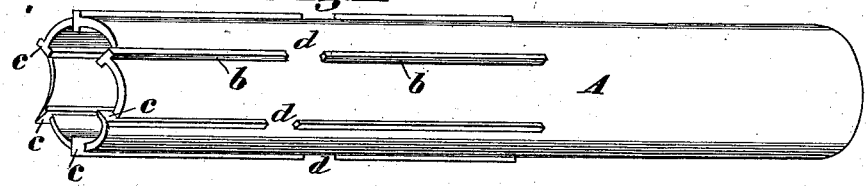
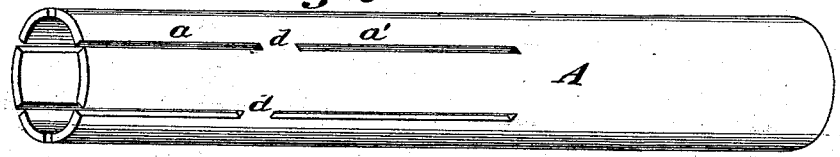
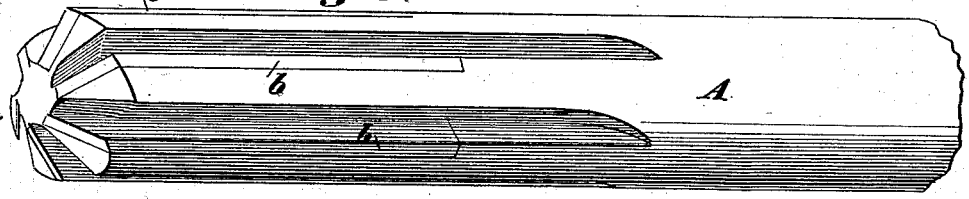
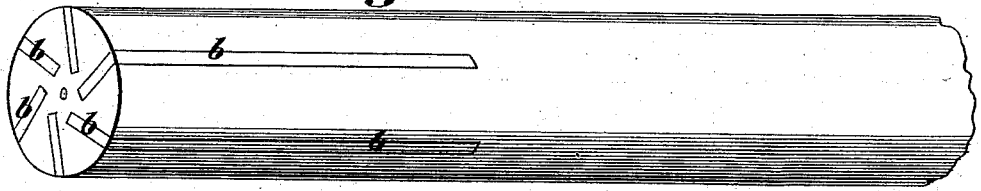

UNITED STATES PATENT OFFICE.

WILLIAM HASENZAHL, OF CINCINNATI, OHIO.

BORING-TOOL FOR STONE-WORKING, &c.

SPECIFICATION forming part of Letters Patent No. 224,530, dated February 17, 1880.

Application filed May 24, 1879.

*To all whom it may concern:*

Be it known that I, WILLIAM HASENZAHL, of Cincinnati, in the county of Hamilton and State of Ohio, have invented certain new and useful Improvements in Boring-Tools; and I do hereby declare the following to be a full, clear, and exact description thereof, which will enable others skilled in the art to which my invention relates to make and use it, reference being had to the accompanying drawings, forming part of this specification, in which—

Figure 1 is a perspective view of a tubular boring-tool constructed in accordance with my invention. Fig. 2 is a similar view of the tube before the cutters are applied. Fig. 3 is a perspective view of a solid cylindrical boring-tool, and Fig. 4 is a view of the iron bar with the steel strips welded therein before being sloped to form the tool.

Similar letters of reference denote the same parts in the several figures of the drawings.

My invention has for its object to provide a cheap and durable tool for boring wood, metal, stone, &c., which shall be more efficient and far less expensive than those now in general use.

Tools of this class are usually made of solid steel bars grooved longitudinally at intervals to form the cutting-edges and radially across the ends to form the points of the cutters. This construction, particularly in large tools, is very expensive both as to material and the labor of cutting it to produce the edges. The tools thus made are always difficult to repair and sharpen when worn down, because of the hardness of the solid steel of which they are wholly composed.

To avoid these objections my invention consists, in general terms, in constructing the main body of the tool of either solid or tubular iron, and welding or brazing in it a series of thin strips of steel, when, by cutting away the iron between the steel strips, the cutting-edges and points are readily produced and sharpened.

In carrying out my invention as applied to a tubular tool, I take an iron tube, A, and cut in it a series of longitudinal slots, $a$ $a'$, at suitable intervals, as shown in Fig. 2, and within these slots I insert narrow strips of steel, $b$, secured in place by welding or brazing. The spaces of iron between the steel strips are then filed or otherwise cut away to project the fronts and sides of the strips, and the latter are afterward ground to an edge, as shown in Fig. 1.

The points $c$ are flattened somewhat to form edges for cutting as the tool advances, and the sides following ream out the hole.

The tool may, of course, be made as a reamer above, as will be readily understood.

When the cutters become worn down by frequent sharpening, the iron can be again filed away to again project the steel, and these operations repeated until the tool has been completely used up.

It will be observed that the proximate ends of the steel strips are not in the same circumferential line, but that spaces $d$ are left between them out of line with each other. This arrangement avoids cutting away the tube continually, and thereby weakening it.

In making the solid tool a round bar of iron, A, is employed, as shown in Fig. 4, with the steel strips brazed or welded into it in the manner above described, and then the iron is cut away on the sides and at the ends to form the cutting-edges and points.

If desired, the cutters can be extended continuously on the solid bar, as it is not materially weakened by being cut away for their insertion.

The cutters in both tools may be arranged parallel to the axis of the stock, or inclined thereto, or placed spirally around it, as may be preferred.

I am aware that it is not new to construct reamers by fitting pieces of steel into a mold and then pouring melted iron into and through the mold until the steel will unite with the iron and become annealed, so that, when cooled, it can be tempered and turned up in a lathe; and I do not, therefore, claim it as my invention.

Having thus described my invention, what I claim is—

1. A boring-tool consisting of a tubular or solid iron bar having a series of longitudinal steel strips welded or brazed therein at suitable intervals to form end cutters, or end and side cutters, substantially as described, for the purpose specified.

2. The two series of steel cutters let into the iron bar or tube so as to leave spaces of iron between the proximate ends of the cutters out of line with each other circumferentially of the tool, substantially as described, for the purpose specified.

In testimony whereof I have hereunto set my hand this 15th day of April, 1879.

WILLIAM HASENZAHL.

Witnesses:
   JOHN H. DUHME,
   L. M. HOSEA.